Patented Aug. 1, 1944

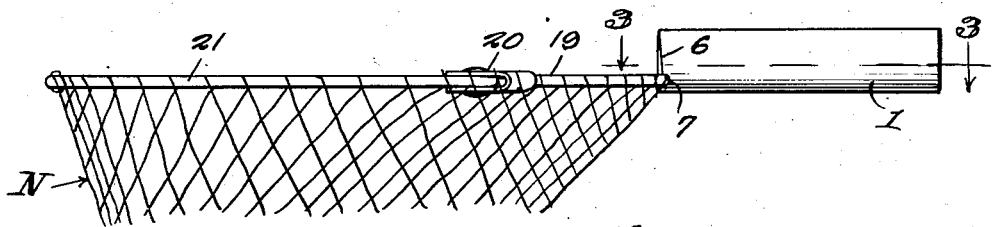
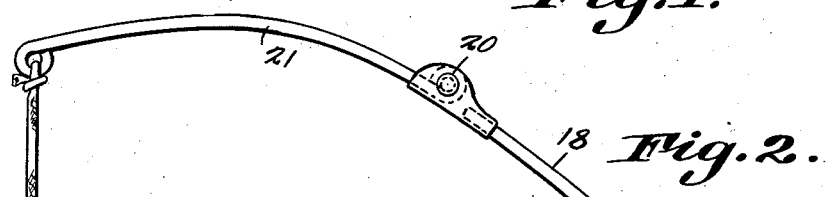
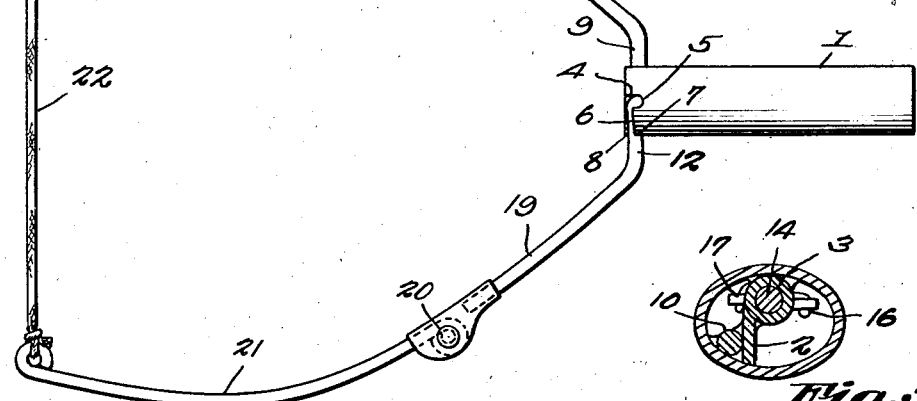
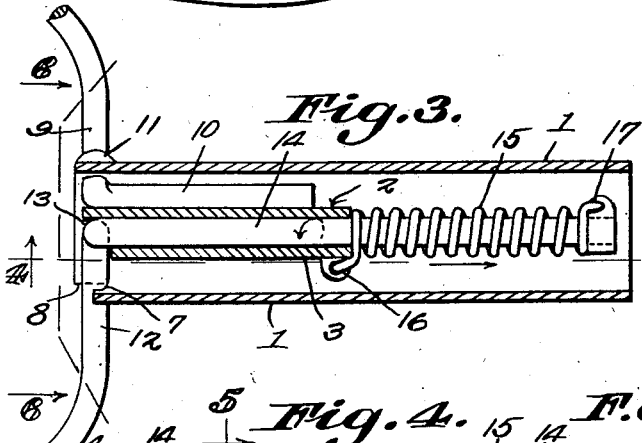
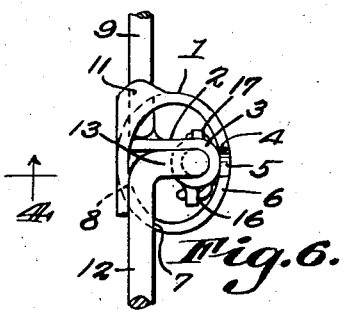
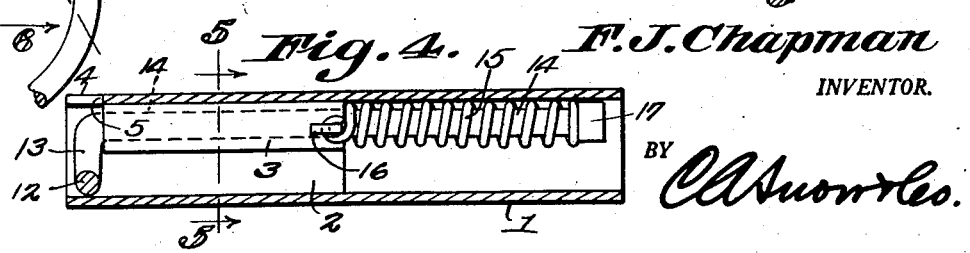

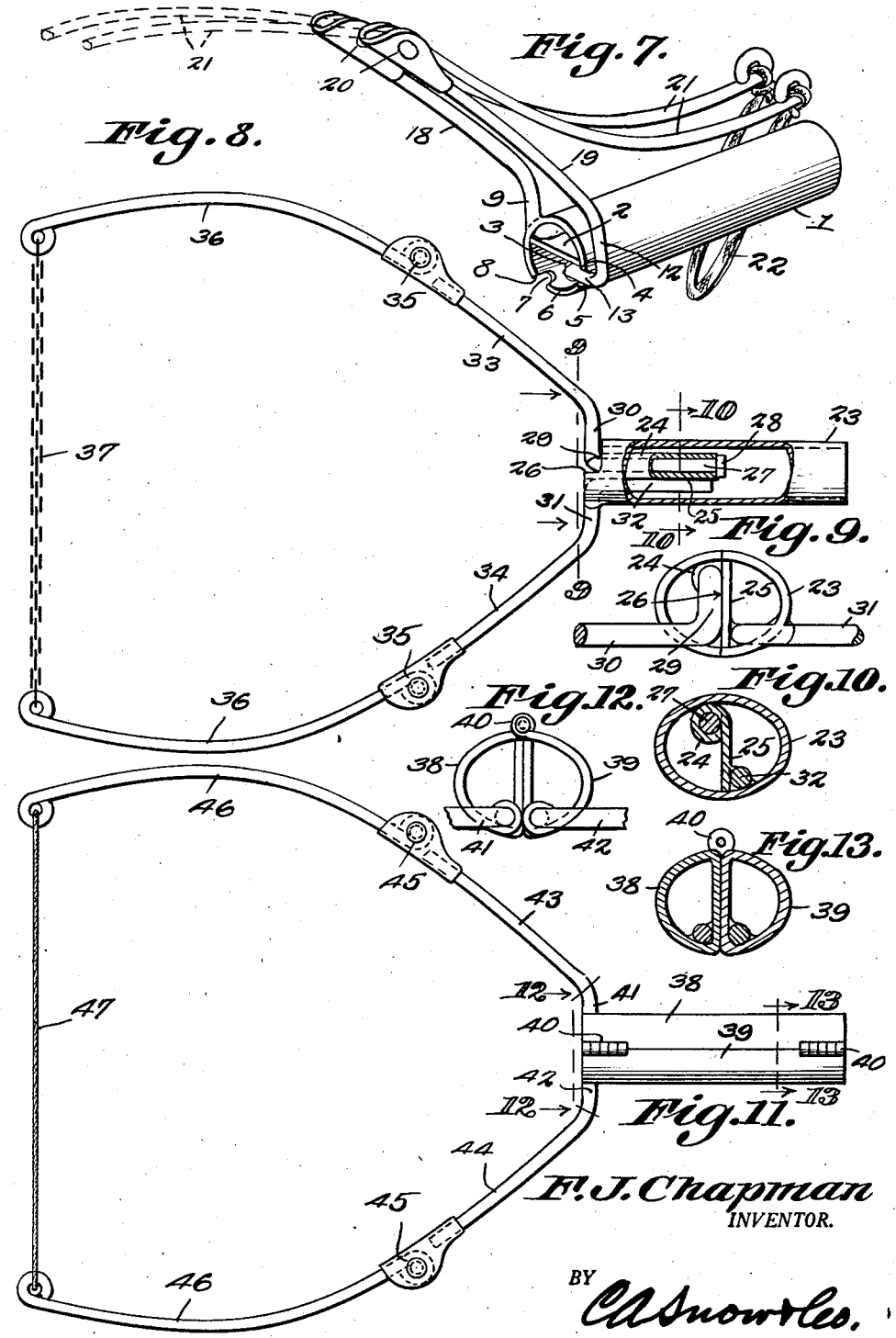

2,354,942

UNITED STATES PATENT OFFICE 2,354,942

LANDING NET

Flavious J. Chapman, Catawba Sanatorium, Va.

Application April 5, 1943, Serial No. 481,919

7 Claims. (Cl. 43—12)

This invention relates to landing nets for use by fishermen and more especially to the net frame, one of the objects being to provide a structure which, while not in use, can be folded readily into a compact space so as to be carried easily.

Another object is to provide a net frame having resilient opposed arms each of which is foldable and so mounted that, when brought to open or active position, are placed under tension so as to maintain those positions and hold the net open until it is desired again to collapse the structure.

Another object is to provide a net frame which can be opened and closed without the use of tools.

It is well known that many fishermen do not carry landing nets because it is necessary usually to have the net open and to attach it to a belt or by a strap over the shoulder. This causes considerable difficulty in traveling through brush. The present invention, however, comprises a structure which can be folded so compactly as to be readily carried in a pocket so that it does not interfere with the movements of the user.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred forms of the invention have been shown.

In said drawings

Figure 1 is a side elevation of a landing net frame embodying the present improvements.

Figure 2 is a plan view of the frame.

Figure 3 is an enlarged section on line 3—3, Figure 1.

Figure 4 is a section on line 4—4, Figure 3.

Figure 5 is a section on line 5—5, Figure 4.

Figure 6 is a section on line 6—6, Figure 3.

Figure 7 is a perspective view showing said frame folded.

Figure 8 is a plan view, partly in section, of a modified form of frame, the same being shown open for use.

Figure 9 is a section on line 9—9, Figure 8.

Figure 10 is an enlarged section on line 10—10, Figure 8.

Figure 11 is a view similar to Fig. 8 illustrating another form of frame.

Figure 12 is an enlarged section on line 12—12, Figure 11.

Figure 13 is an enlarged section on line 13—13, Figure 11.

Referring to the figures by characters of reference, 1 designates a tubular handle of any desired length and transverse contour, this handle being open at one or both ends and being provided with a longitudinal web 2 carrying an integral sleeve 3. This web and sleeve are within and fixedly connected to the handle and are located adjacent to one end of the handle. Said end has a stop shoulder 4 at the base of which is a notch or recess 5, the shoulder being a continuation of one wall of this notch. The other wall of the notch terminates at a cam edge 6 which extends more than 90° to one side of another notch 7 the other side of which merges into a stop shoulder 8.

A resilient rod is extended outwardly through the wall of the handle 1 close to the notched end of the handle and, for the purpose of providing strength, has a finger 19 extended longitudinally along a portion of the inner surface of the wall of the handle, this finger being brazed, soldered or otherwise attached to said handle and to the web 2 while the outwardly extending portion of the rod 9 can be likewise reenforced by added metal indicated at 11.

The notch 7 is substantially alined with the outwardly extended rod 9 and provides a seat for the outwardly extended rod 12 which is of highly resilient material and has at one end an offset portion 13 merging into a finger 14. This finger is extended into the sleeve 3 and is adapted to slide and rotate therein. The sleeve is located close to and inwardly from the notched side and a coiled spring 15, which is mounted on the inner end portion of the finger 14, is anchored at one end to the sleeve 3 as shown at 16 while its other end is fastened to the finger 14 as indicated at 17. This spring is normally stretched so as to urge the finger 14 backwardly into handle 1 so that the outwardly extending portion of the rod 12 will thus be held in either of the notches 5 and 7 with which it is brought into register. The spring also exerts a torsional force tending to urge finger 14 in one direction so as to cause the rod 12 to travel from notch 5 to notch 7 when said rod is unseated from the notch 5.

The two rods 9 and 12 merge into diverging members 18 and 19 respectively connected by elbow joints 20 to resilient extensions 21. The outer or free ends of these extensions are connected by a flexible restraining element 22 which can be in the form of a strong cord, or the like. This connection is of such length that when the two arms formed by the parts 9, 18 and 21 and 12, 19 and 21 are swung apart to one limit of their movement, the connection 22 will be drawn taut and will place the opposed arms under tension and maintain them in oppositely bowed positions. With the parts thus positioned, as shown for example in Figs. 1, 2, 3 and 6, the rod 12 has been moved past a dead center against the stop shoulder 8 so that the arms are maintained under tension without danger of swinging toward each other, it being noted that spring 15 serves both to urge rod 12 against shoulder 8 and also to pull it back into the notch 7.

A net of suitable material and indicated at N is connected to the opposed arms and to the connection 22 and is adapted to be folded or distended by the movement of the arms.

When it is desired to collapse the frame and net, the rod 12 is pulled outwardly against the action of spring 15 so as to be withdrawn from notch 7 and it is then swung along the cam edge 6 until it reaches the notch 5 whereupon spring 15, which had been placed under increased compression, will expand and pull rod 12 back into the notch 5. This will bring the two rods 9 and 12 and the members 18 and 19 into parallel relation and the extensions 21 can then be folded back at the elbow joints 20 to bring the parts in the positions shown in Fig. 7. Consequently the entire device will form a compact package or bundle which can easily be inserted in a pocket for convenience in carrying.

When it is desired to use the net, the foregoing operation is reversed. The extensions 21 are swung outwardly to the dotted line positions shown in Fig. 7 and the rod 12 is pulled out of the notch 5 against the action of spring 15. This releases the spring so that it can exert its torsional force to swing rod 12 away from notch 5 and along cam edge 6 until it reaches shoulder 8 whereupon it will snap down into the notch 7. This movement has brought the arms formed by rod 12, member 19 and extension 21 past a dead center and the two arms will be placed under tension due to the retarding action exerted by the connection 22. The net, which is attached to the arms and connection will, of course, be opened by this operation and can then be used, the part 1 providing the necessary handle.

Instead of providing a spring such as shown in the structure illustrated in Figs. 1 to 7 inclusive, the structure may be modified as shown in Figs. 8 to 10 inclusive. In this modified structure the tubular handle 23 has a sleeve 24 fixedly supported therein adjacent to one end and said end of the handle is cut away to expose one side of a web or partition 25 located in the handle. This exposed portion of the web constitutes a transverse stop shoulder 26, the sleeve 24 being located at one side thereof and close to the wall of the handle as shown particularly in Figs. 9 and 10.

Mounted for rotation in the sleeve 24 is a finger 27 which can be held against longitudinal movement in any suitable manner, as by means of a head or enlargement 28 on the inner end thereof. The outer end of this finger merges into the offset end 29 of a laterally extended resilient rod 30. Another laterally extended resilient rod 31 is anchored to said end of the sleeve, it preferably being provided with a finger 32 extended downwardly in the handle and joined rigidly to the sleeve and handle. These rods 30 and 31 are so located that when the offset portion 29 is swung laterally against the stop shoulder 26, these two rods will be in alinement but out of line with the member 27.

Rods 30 and 31 merge into resilient fingers 33 and 34 respectively and these, in turn, are joined by elbow connections 35 to resilient extensions 36 the outer or free ends of which are connected by a flexible restraining element 37 which can be in the form of a light chain, or the like. This connection is of such length that when the opposed arms made up of the parts 30, 33 and 36 and 31, 34 and 36, are moved apart to their maximum distances, the two arms will be caused to bow in opposite directions and be placed under tension. When the arms are thus located, the offset portion 29 is pressed tightly against the stop 26 by the tension of the opposed arms, and said arms, which are to have the open end of the net attached to them and to their connection 37, will thus act as efficient means for holding the net open. In order to collapse the structure it is necessary to swing the arm 33 about the axis of finger 27 until it has passed a dead center whereupon the tension of the two opposed arms will be removed and they can be brought into parallel relation and then folded in the same manner as has been described in connection with the structure shown in Figs. 1 to 7 inclusive. To open the frame, the foregoing operation is reversed, the extensions 36 first being swung outwardly away from the members 33 and 34, and then said members, with their extensions being moved apart until the two opposed arms have been placed under tension by the connection 37 and member 33 has moved past a dead center with its offset portion 29 bearing against the stop 26.

In Figs. 11 to 13 another modification has been illustrated. In this structure the handle is made up of two opposed members 38 and 39 hingedly connected along one edge as shown at 40. Resilient rods 41 and 42 are rigidly secured to and extended in opposite directions from the respective handle sections at points remote from the hinge 40 and these rods merge into resilient members 43 and 44 joined by elbow connections 45 to resilient extensions 46 which, as in the other structures described, are held under restraint at their outer or free ends by a resilient connection 47.

When it is desired to collapse this form of the invention, the two arms are swung toward each other upon the hinges 40 which are out of line with the rods 41 and 42. Therefore as the arms are thus swung toward each other they are brought into parallel relation and the extensions 46 can then be folded back as before explained. To set up this frame for use the extensions 46 are swung outwardly away from members 43 and 44 after which the arms are swung away from each other until the opposed handle sections are brought together as in Figs. 12 and 13. This necessitates movement of the arms past a dead center with the result that the opposed members 43 and 44 and their extensions 46 are placed under tension while being restrained by the connection 47. This frame is adapted to support a net in the same manner as do the other frames which have been described.

As before stated importance is attached to the fact that the frames with the nets attached to them can readily be folded and carried in the pocket so that they can be handled easily while being carried from place to place.

What is claimed is:

1. A frame for landing nets including opposed resilient arms, each arm comprising hingedly connected portions, a restraining element connecting the arms and proportioned to place the arms under tension when oppositely disposed to each other, and a handle connecting the arms for relative movement past a dead center and means on the handle and cooperating with the arms for limiting their movement in one direction past a dead center thereby to maintain the arms under tension exerted by the restraining means.

2. A frame for landing nets including a handle, relatively movable arms carried thereby, each arm comprising hingedly connected portions, one of the portions being movable in one direction to fold towards the other portion and being movable in the opposite direction to extend outwardly from the other portion, a restraining element connecting the opposed arms, and means for holding the arms removably in oppositely disposed positions thereby to maintain the connection taut and the arms under tension.

3. A frame for landing nets including oppositely disposed resilient arms mounted for relative swinging movement, means for limiting the movement of said arms in one direction when brought opposite to each other and past a dead center, each of the arms comprising hingedly connected portions, means cooperating with the portions for limiting their relative movement when unfolded, and a flexible restraining means connecting the opposed arms for placing the arms under tension when shifted past a dead center to oppositely disposed positions.

4. A frame for landing nets including a handle, opposed resilient arms carried thereby and mounted for relative movement toward or from each other about axes extending longitudinally of the handle, restraining means connecting the arms for holding them under tension when moved apart relative to each other, means on the handle for limiting the relative movement of the arms when moved past a dead center to oppositely disposed positions, each of said arms including hingedly connected portions foldable together when the arms are out of oppositely disposed positions, the restraining means being positioned to prevent the arms from folding when they are oppositely disposed.

5. A frame for landing nets including a handle, oppositely disposed resilient arms carried thereby, one of said arms being fixed to the handle, resilient means cooperating with the other arm and the handle for rotating said last named arm in one direction relative to the handle and into a position opposite to the other arm, means on the handle and controlled by said resilient means for securing said movable arm in either of two extreme positions, and a restraining element connecting the arms.

6. A frame for landing nets including a handle, oppositely disposed resilient arms carried thereby, one of said arms being fixed to the handle, resilient means cooperating with the other arm and the handle for rotating said last named arm in one direction relative to the handle and into a position opposite to the other arm, means on the handle and controlled by said resilient means for securing said movable arm in either of two extreme positions, and a restraining element connecting the arms, each of said elements comprising hingedly connected members, the restraining means constituting a means for holding the arms against folding when oppositely positioned and at the same time maintaining the arms under tension.

7. A frame for landing nets including a handle comprising hingedly connected portions oppositely disposed, a resilient arm connected to each of said portions, said arms being movable past a dead center into or out of opposed positions, each arm including hingedly connected members, means cooperating with the members for limiting the relative movement of the members of the arm when the arms are in oppositely disposed positions, and restraining means connecting said arms and cooperating therewith to hold them under tension when the arms are oppositely disposed past a dead center and for releasing the arms for folding when said arms are moved past a dead center away from opposed positions.

FLAVIOUS J. CHAPMAN.